(12) United States Patent
Hosie et al.

(10) Patent No.: US 10,331,449 B2
(45) Date of Patent: Jun. 25, 2019

(54) ENCODING INSTRUCTIONS IDENTIFYING FIRST AND SECOND ARCHITECTURAL REGISTER NUMBERS

(71) Applicant: ARM LIMITED, Cambridge (GB)

(72) Inventors: Simon Hosie, Santa Clara, CA (US); Jørn Nystad, Trondheim (NO)

(73) Assignee: ARM Limited, Cambridge (GB)

( * ) Notice: Subject to any disclaimer, the term of this patent is extended or adjusted under 35 U.S.C. 154(b) by 394 days.

(21) Appl. No.: 15/003,828

(22) Filed: Jan. 22, 2016

(65) Prior Publication Data

US 2017/0212758 A1     Jul. 27, 2017

(51) Int. Cl.
*G06F 9/30*     (2018.01)
*G06F 9/38*     (2018.01)

(52) U.S. Cl.
CPC .......... *G06F 9/3016* (2013.01); *G06F 9/3005* (2013.01); *G06F 9/3012* (2013.01); *G06F 9/30021* (2013.01); *G06F 9/30098* (2013.01); *G06F 9/384* (2013.01)

(58) Field of Classification Search
CPC .. G06F 9/30098; G06F 9/3012; G06F 9/3016; G06F 9/384; G06F 9/3005; G06F 9/30021
See application file for complete search history.

(56) References Cited

U.S. PATENT DOCUMENTS

| | | | |
|---|---|---|---|
| 6,282,634 B1 * | 8/2001 | Hinds | G06F 7/5443 712/210 |
| 2003/0236965 A1 | 12/2003 | Sheaffer | |
| 2005/0060520 A1 | 3/2005 | Cascaval et al. | |
| 2007/0186210 A1 * | 8/2007 | Hussain | G06F 9/30145 717/106 |
| 2011/0296140 A1 | 12/2011 | Chang et al. | |
| 2015/0178076 A1 * | 6/2015 | Sudhakar | G06F 9/30098 712/210 |

OTHER PUBLICATIONS

T. Okuma, H. Tomiyama, A. Inoue, E. Fajar and H. Yasuura, "Instruction encoding techniques for area minimization of instruction ROM," Proceedings. 11th International Symposium on System Synthesis (Cat. No. 98EX210), Hsinchu, 1998, pp. 125-130. (Year: 1998).*

International Search Report and Written Opinion of the International Searching Authority dated Oct. 10, 2016 in PCT/GB2016/051503, 10 pages.

* cited by examiner

*Primary Examiner* — Benjamin P Geib
*Assistant Examiner* — Kasim Alli
(74) *Attorney, Agent, or Firm* — Nixon & Vanderhye P.C.

(57) ABSTRACT

Various encoding schemes are discussed for more efficiently encoding instructions which identify first and second architectural register numbers. In the first example, by constraining the first architectural register number to be greater than the second architectural register number, this frees up encodings for use in encoding other operations. In a second example, the first and second architectural register numbers may take any value but one of a first type of processing operation and a second type of processing operation is selected depending on a comparison of the first and second architectural register numbers.

14 Claims, 12 Drawing Sheets

```
E D C B A 9 8 7 6 5 4 3 2 1 0
```
| Rd | Opc | Rx | Ry |
|---|---|---|---|

Opcode:
0 0 0   ADD Rd, Rx, Ry
0 0 1   SUB Rd, Rx, Ry
0 1 0   AND Rd, Rx, Ry
0 1 1   OR Rd, Rx, Ry
1 0 0   MUL Rd, Rx, Ry
1 0 1   DIV Rd, Rx, Ry
1 1 0   BITREV Rd, Rx
1 1 1   CLZ Rd, Rx

FIG. 2

1st class:
```
D C B A 9 8 7 6 5 4 3 2 1 0
```
| Rd | Opc | B | A |
|---|---|---|---|

2nd class:
```
D C B A 9 8 7 6 5 4 3 2 1 0
```
| Rd | Opc | S | B | A |
|---|---|---|---|---|

Opcode:
0 0 0   ADD Rd, Rx, Ry
0 0 1   AND Rd, Rx, Ry
0 1 0   OR Rd, Rx, Ry
0 1 1   MUL Rd, Rx, Ry
1 0 0   SUB Rd, Rx, Ry
1 0 1   SUB Rd, Ry, Rx
1 1 0   DIV Rd, Rx, Ry
1 1 1   DIV Rd, Ry, Rx Opcode:
0 0   BITREV Rd, Rx
0 1   CLZ, Rd, Rx
1 0   MUL Rd, Rx, Rx
1 1   undefined Rx = DecodeRx(S, B, A)
Ry = DecodeRy(S, B, A)

FIG. 3

A = x EOR Replicate(y<N-1>)    B = x<n-2:0> EOR y<N-2:0>

| Rx / Ry | 0000 | 0001 | 0010 | 0011 | 0100 | 0101 | 0110 | 0111 |
|---|---|---|---|---|---|---|---|---|
| 0000 | — | A = 0001, B = 001 | A = 0010, B = 010 | A = 0011, B = 011 | A = 0100, B = 100 | A = 0101, B = 101 | A = 0110, B = 110 | A = 0111, B = 111 |
| 0001 | | — | A = 0010, B = 011 | A = 0011, B = 010 | A = 0100, B = 101 | A = 0101, B = 100 | A = 0110, B = 111 | A = 0111, B = 110 |
| 0010 | | | — | A = 0011, B = 001 | A = 0100, B = 110 | A = 0101, B = 111 | A = 0110, B = 100 | A = 0111, B = 101 |
| 0011 | | | | — | A = 0100, B = 111 | A = 0101, B = 110 | A = 0110, B = 101 | A = 0111, B = 100 |
| 0100 | | | | | — | A = 0101, B = 001 | A = 0110, B = 010 | A = 0111, B = 011 |
| 0101 | | | | | | — | A = 0110, B = 011 | A = 0111, B = 010 |
| 0110 | | | | | | | — | A = 0111, B = 001 |
| 0111 | | | | | | | | — |
| 1000 | | | | | | | | |
| 1001 | | | | | | | | |
| 1010 | | | | | | | | |
| 1011 | | | | | | | | |
| 1100 | | | | | | | | |
| 1101 | | | | | | | | |
| 1110 | | | | | | | | |
| 1111 | | | | | | | | |

| spare encodings: | A = 0000, B = 000 | A = 0001, B = 000 | A = 0010, B = 000 | A = 0011, B = 000 | A = 0100, B = 000 | A = 0101, B = 000 | A = 0110, B = 000 | A = 0111, B = 000 |

FIG. 4A

| Rx \ Ry | 1000 | 1001 | 1010 | 1011 | 1100 | 1101 | 1110 | 1111 |
|---|---|---|---|---|---|---|---|---|
| 0000 | A = 1000, B = 000 | A = 1001, B = 001 | A = 1010, B = 010 | A = 1011, B = 011 | A = 1100, B = 100 | A = 1101, B = 101 | A = 1110, B = 110 | A = 1111, B = 111 |
| 0001 | A = 1000, B = 001 | A = 1001, B = 000 | A = 1010, B = 011 | A = 1011, B = 010 | A = 1100, B = 101 | A = 1101, B = 100 | A = 1110, B = 111 | A = 1111, B = 110 |
| 0010 | A = 1000, B = 010 | A = 1001, B = 011 | A = 1010, B = 000 | A = 1011, B = 001 | A = 1100, B = 110 | A = 1101, B = 111 | A = 1110, B = 100 | A = 1111, B = 101 |
| 0011 | A = 1000, B = 011 | A = 1001, B = 010 | A = 1010, B = 001 | A = 1011, B = 000 | A = 1100, B = 111 | A = 1101, B = 110 | A = 1110, B = 101 | A = 1111, B = 100 |
| 0100 | A = 1000, B = 100 | A = 1001, B = 101 | A = 1010, B = 110 | A = 1011, B = 111 | A = 1100, B = 000 | A = 1101, B = 001 | A = 1110, B = 010 | A = 1111, B = 011 |
| 0101 | A = 1000, B = 101 | A = 1001, B = 100 | A = 1010, B = 111 | A = 1011, B = 110 | A = 1100, B = 001 | A = 1101, B = 000 | A = 1110, B = 011 | A = 1111, B = 010 |
| 0110 | A = 1000, B = 110 | A = 1001, B = 111 | A = 1010, B = 100 | A = 1011, B = 101 | A = 1100, B = 010 | A = 1101, B = 011 | A = 1110, B = 000 | A = 1111, B = 001 |
| 0111 | A = 1000, B = 111 | A = 1001, B = 110 | A = 1010, B = 101 | A = 1011, B = 100 | A = 1100, B = 011 | A = 1101, B = 010 | A = 1110, B = 001 | A = 1111, B = 000 |
| 1000 | — | A = 0110, B = 001 | A = 0101, B = 010 | A = 0100, B = 011 | A = 0011, B = 100 | A = 0010, B = 101 | A = 0001, B = 110 | A = 0000, B = 111 |
| 1001 | — | — | A = 0101, B = 011 | A = 0100, B = 010 | A = 0011, B = 101 | A = 0010, B = 100 | A = 0001, B = 111 | A = 0000, B = 110 |
| 1010 | — | — | — | A = 0100, B = 001 | A = 0011, B = 110 | A = 0010, B = 111 | A = 0001, B = 100 | A = 0000, B = 101 |
| 1011 | — | — | — | — | A = 0011, B = 111 | A = 0010, B = 110 | A = 0001, B = 101 | A = 0000, B = 100 |
| 1100 | — | — | — | — | — | A = 0010, B = 001 | A = 0001, B = 010 | A = 0000, B = 011 |
| 1101 | — | — | — | — | — | — | A = 0001, B = 011 | A = 0000, B = 010 |
| 1110 | — | — | — | — | — | — | — | A = 0000, B = 001 |
| 1111 | — | — | — | — | — | — | — | — |

FIG. 4A (continued)

if (y >= N/2) then A = x EOR (N-1), B = y EOR (N-1), else A = x, B = y

| Rx / Ry | 0000 | 0001 | 0010 | 0011 | 0100 | 0101 | 0110 | 0111 |
|---|---|---|---|---|---|---|---|---|
| 0000 | ✕ | A = 0001, B = 000 | A = 0010, B = 000 | A = 0011, B = 000 | A = 0100, B = 000 | A = 0101, B = 000 | A = 0110, B = 000 | A = 0111, B = 000 |
| 0001 | | ✕ | A = 0010, B = 001 | A = 0011, B = 001 | A = 0100, B = 001 | A = 0101, B = 001 | A = 0110, B = 001 | A = 0111, B = 001 |
| 0010 | | | ✕ | A = 0011, B = 010 | A = 0100, B = 010 | A = 0101, B = 010 | A = 0110, B = 010 | A = 0111, B = 010 |
| 0011 | | | | ✕ | A = 0100, B = 011 | A = 0101, B = 011 | A = 0110, B = 011 | A = 0111, B = 011 |
| 0100 | | | | | ✕ | A = 0101, B = 100 | A = 0110, B = 100 | A = 0111, B = 100 |
| 0101 | | | | | | ✕ | A = 0110, B = 101 | A = 0111, B = 101 |
| 0110 | | | | | | | ✕ | A = 0111, B = 110 |
| 0111 | | | | | | | | ✕ |
| 1000 | | | | | | | | |
| 1001 | | | | | | | | |
| 1010 | | | | | | | | |
| 1011 | | | | | | | | |
| 1100 | | | | | | | | |
| 1101 | | | | | | | | |
| 1110 | | | | | | | | |
| 1111 | | | | | | | | |

| spare encodings: | A = 0000, B = 000 | A = 0001, B = 001 | A = 0010, B = 010 | A = 0011, B = 011 | A = 0100, B = 100 | A = 0101, B = 101 | A = 0110, B = 110 | A = 0111, B = 111 |

FIG. 4B

| Ry \ Rx | 1000 | 1001 | 1010 | 1011 | 1100 | 1101 | 1110 | 1111 |
|---|---|---|---|---|---|---|---|---|
| 0000 | A = 1000, B = 000 | A = 1001, B = 000 | A = 1010, B = 000 | A = 1011, B = 000 | A = 1100, B = 000 | A = 1101, B = 000 | A = 1110, B = 000 | A = 1111, B = 000 |
| 0001 | A = 1000, B = 001 | A = 1001, B = 001 | A = 1010, B = 001 | A = 1011, B = 001 | A = 1100, B = 001 | A = 1101, B = 001 | A = 1110, B = 001 | A = 1111, B = 001 |
| 0010 | A = 1000, B = 010 | A = 1001, B = 010 | A = 1010, B = 010 | A = 1011, B = 010 | A = 1100, B = 010 | A = 1101, B = 010 | A = 1110, B = 010 | A = 1111, B = 010 |
| 0011 | A = 1000, B = 011 | A = 1001, B = 011 | A = 1010, B = 011 | A = 1011, B = 011 | A = 1100, B = 011 | A = 1101, B = 011 | A = 1110, B = 011 | A = 1111, B = 011 |
| 0100 | A = 1000, B = 100 | A = 1001, B = 100 | A = 1010, B = 100 | A = 1011, B = 100 | A = 1100, B = 100 | A = 1101, B = 100 | A = 1110, B = 100 | A = 1111, B = 100 |
| 0101 | A = 1000, B = 101 | A = 1001, B = 101 | A = 1010, B = 101 | A = 1011, B = 101 | A = 1100, B = 101 | A = 1101, B = 101 | A = 1110, B = 101 | A = 1111, B = 101 |
| 0110 | A = 1000, B = 110 | A = 1001, B = 110 | A = 1010, B = 110 | A = 1011, B = 110 | A = 1100, B = 110 | A = 1101, B = 110 | A = 1110, B = 110 | A = 1111, B = 110 |
| 0111 | A = 1000, B = 111 | A = 1001, B = 111 | A = 1010, B = 111 | A = 1011, B = 111 | A = 1100, B = 111 | A = 1101, B = 111 | A = 1110, B = 111 | A = 1111, B = 111 |
| 1000 | X | A = 0110, B = 111 | A = 0101, B = 111 | A = 0100, B = 111 | A = 0011, B = 111 | A = 0010, B = 111 | A = 0001, B = 111 | A = 0000, B = 111 |
| 1001 |  | X | A = 0101, B = 110 | A = 0100, B = 110 | A = 0011, B = 110 | A = 0010, B = 110 | A = 0001, B = 110 | A = 0000, B = 110 |
| 1010 |  |  | X | A = 0100, B = 101 | A = 0011, B = 101 | A = 0010, B = 101 | A = 0001, B = 101 | A = 0000, B = 101 |
| 1011 |  |  |  | X | A = 0011, B = 100 | A = 0010, B = 100 | A = 0001, B = 100 | A = 0000, B = 100 |
| 1100 |  |  |  |  | X | A = 0010, B = 011 | A = 0001, B = 011 | A = 0000, B = 011 |
| 1101 |  |  |  |  |  | X | A = 0001, B = 010 | A = 0000, B = 010 |
| 1110 |  |  |  |  |  |  | X | A = 0000, B = 001 |
| 1111 |  |  |  |  |  |  |  | X |

FIG. 4B (continued)

cond:
00 == (Rx > Ry) or != (Rx < Ry)
01 < or >=
10 > or <=
11 reserved

ENCODING INSTRUCTIONS IDENTIFYING FIRST AND SECOND ARCHITECTURAL REGISTER NUMBERS

BACKGROUND

Technical Field

The present technique relates to the field of data processing.

Technical Background

A data processing apparatus may have processing circuitry configured to execute instructions encoded according to a given instruction set architecture (ISA). The instructions may be represented using a given number of bits which are decoded to identify what processing operation should be performed and which registers are to be used during the processing operations. ISA design can be challenging because while there may be a large variety of processing operations which it might theoretically be desirable to support, increasing the number of bits in each instruction to accommodate additional operations tends to increase the circuit area and power consumption of processing devices executing instructions according to the ISA, because additional bits would need to be carried along the processing pipeline for each instruction, more complex decoding circuitry may be required, and the memory space required for storing a program in memory would increase with the size of the instructions. On the other hand, to save circuit area and energy, the number of bits in the instruction encoding can be limited to a certain number, but then this may require a compromise as to which operations are supported by the ISA.

SUMMARY

At least some examples provide an apparatus comprising:
a plurality of registers to store data values; and
processing circuitry to perform processing operations in response to instructions;
wherein in response to one of a first class of instructions identifying first and second architectural register numbers, the processing circuitry is configured to perform a corresponding processing operation using first and second registers corresponding to the first and second architectural register numbers; and
instructions of said first class of instructions have an instruction encoding which constrains said first architectural register number to be greater than said second architectural register number.

At least some examples provide a data processing method, comprising:
controlling processing circuitry to perform processing operations in response to instructions;
wherein in response to one of a first class of instructions identifying first and second architectural register numbers, the processing circuitry is controlled to perform a corresponding processing operation using first and second registers corresponding to the first and second architectural register numbers; and
instructions of said first class of instructions have an instruction encoding which constrains said first architectural register number to be greater than said second architectural register number.

At least some examples provide an apparatus comprising:
a plurality of registers to store data values; and
processing circuitry to perform processing operations in response to instructions; wherein:

in response to an instruction having an instruction encoding identifying first and second architectural register numbers, the processing circuitry is configured to select, in dependence on a comparison of the first and second architectural register numbers whether to perform a first type of processing operation or a second type of processing operation using registers corresponding to the first and second architectural register numbers.

At least some examples provide a data processing method comprising:
in response to an instruction having an instruction encoding identifying first and second architectural register numbers, comparing the first and second architectural register numbers; and
in dependence on the comparison of the first and second architectural register numbers, selecting whether to perform a first type of processing operation or a second type of processing operation using registers corresponding to the first and second architectural register numbers.

A computer-readable storage medium may be provided storing a computer program for controlling a computer to provide a virtual machine execution environment corresponding to either of the apparatuses mentioned above. The storage medium may be a non-transitory storage medium.

Further aspects, features and advantages of the present technique will be apparent from the following description of examples, which is to be read in conjunction with the accompanying drawings.

BRIEF DESCRIPTION OF THE DRAWINGS

FIG. 2 shows an example of an instruction encoding identifying first and second architectural register numbers which may take any values;

FIG. 3 shows an example of an instruction encoding providing a first class of instructions in which a first architectural register number is constrained to be greater than a second architectural register number and a second class of instructions encoding a single source architectural register number;

FIGS. 4A and 4B show two possible encodings of first and second register fields of the first class of instructions shown in FIG. 3;

DESCRIPTION OF EXAMPLES

Figure 1:
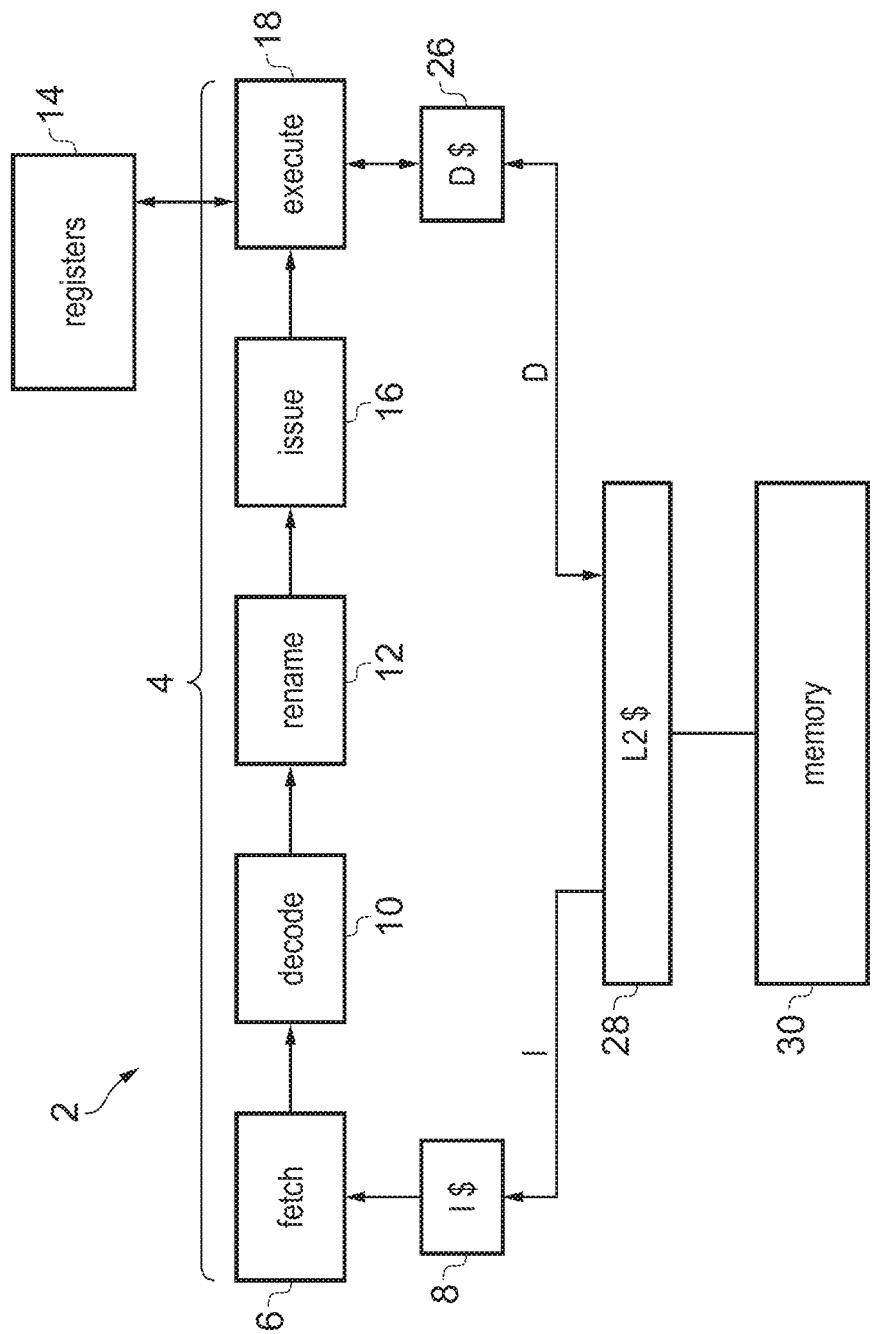
FIG. 1 schematically illustrates an example of a data processing apparatus having a processing pipeline for processing instructions.

Some specific examples are shown below. It will be appreciated that the invention is not limited to these examples.

The processing circuitry may support some instructions which identify first and second architectural register numbers. In response to such an instruction, the processing circuitry may perform a corresponding processing operation using first and second register corresponding to the first and second architectural register numbers. Typical ISAs specify a given number of architectural registers, and encode the instruction so that any of those architectural registers can be specified as the first and second architectural register numbers in any combination.

However, the inventors recognised that there is some redundancy in such an approach because swapping which registers are referred to as the first and second architectural register numbers respectively may not give a different result. For example, an add instruction for adding the values stored in registers R1 and R2 gives the same result as an add instruction for adding the values in registers R2 and R1. Hence, typical ISAs can use up a significant amount of the instruction encoding space in separately encoding both orders of a given pair of registers for a given processing operation. The present technique provides techniques which can exploit this redundancy to provide a more efficient encoding of the instructions.

In a first example, a first class of instructions may be provided having an instruction encoding which constrains the first architectural register number to be greater than the second architectural register number. By eliminating the option for the first architectural register number to be less than or equal to the second architectural register number, the number of valid combinations of architectural registers is reduced and this can free up some instruction encodings for use for signalling other processing operations. Compared to the case where any combination of architectural registers can be specified, by limiting the first architectural register number to be greater than the second architectural register number, the number of valid register pair encodings can be reduced by over half, allowing them to be identified using one fewer bit. This can either enable the instructions to be encoded using fewer bits in total, saving energy and power in the processing device which executes the instructions, or permit a given number of bits to represent a wider range of different processing operations to support added functionality, since an additional bit would be available for encoding the processing operation to be performed.

For conciseness, the first architectural register number is referred to below as Rx and the second architectural register number is referred to as Ry, with Rx>Ry.

The apparatus may have physical registers provided in hardware which can be accessed by the processing circuitry in response to the instructions. In some embodiments, the architectural register numbers Rx, Ry may also identify the physical registers to be used. In this case, the constraint where Rx>Ry may also constrain which physical registers may store the data to be processed. However, other embodiments may support register renaming in which the architectural register numbers specified by an instruction may be mapped to different physical registers provided in hardware. In this case, while the instruction encoding may require Rx>Ry, this need not constrain the choice of physical registers in any way, as register renaming circuitry may still have freedom to map the specified architectural register numbers to any available physical register. Note that while the instruction encoding constrains the architectural register numbers such that Rx>Ry, there is no constraint in the data stored in the corresponding registers—the data stored in Rx and Ry may take any values.

The processing circuitry may have decoding circuitry to decode the first class of instructions according to the instruction encoding in which Rx is constrained to be greater than Ry.

For at least some of the first class of instructions, the first and second architectural register numbers Rx, Ry may be source architectural register numbers which identify registers storing operand values to be processed in response to the corresponding instruction (e.g. an arithmetic or logical instruction may have its source operands identified by architectural registers where Rx>Ry). The instruction may also specify a destination register to which the result of the operation is to be written. The choice of destination register may be unconstrained, and so any architectural register could be specified as the destination architectural register, regardless of the choice of the source architectural registers Rx, Ry.

On the other hand, for other instructions of the first class of instructions, one or both of the first and second architectural register numbers Rx, Ry may identify a destination register to which a result is to be written. For example, a load multiple instruction could specify two destination registers Rx, Ry to which values are to be loaded from memory using an encoding where Rx>Ry.

In one example, the first class of instructions may include at least one commutative instruction for which the corresponding processing operation is a commutative operation. A commutative operation may be an operation which when applied to a given set of operands will give the same result regardless of the order in which the operands are input (e.g. a function f(m, n) for which f(A, B)=f(B, A) even if A≠B). For example, addition is a commutative operation since 2+3=3+2. Other examples of commutative operations include multiply, absolute difference, and some bitwise logical operations such as AND, OR, and XOR. For a commutative operation, allowing encodings where Rx<Ry in addition to encodings where Rx>Ry would be totally redundant because the same result would be generated regardless of the order of the input operands. Therefore, for such operations the loss of encodings where Rx<Ry does not affect the functionality provided by the ISA. A compiler may simply choose an instruction encoding ADD R3, R2 for example instead of ADD R2, R3.

For some commutative operations, it may still be of interest to apply the operation to two identical operands, and so excluding the encoding where Rx=Ry may limit functionality to some extent. However, for some types of operation there may already be another operation supported by the ISA which will give the same result as applying the operation to two identical inputs (for example, Rx+Rx may be equivalent to Rx*2 or a left-shift by one bit position, so an add instruction which permits both source registers to be the same may not be essential).

Also, even if a certain commutative operation applied to two identical inputs does not have an equivalent elsewhere in the instruction set architecture, the same operand value could be written to two different architectural registers Rx, Ry so that the corresponding commutative instruction can still be executed with Rx>Ry.

Also, if for a given commutative operation applying the operation to two identical operands is likely to be used so often that it would be desirable to support this explicitly in the ISA, or it is desirable to avoid the added register pressure associated with using two different registers to store the same value, then a second instruction type (e.g. with a different opcode) could be implemented elsewhere in the instruction set encoding space to perform that particular commutative operation with the identical inputs. For example, in addition to a multiply instruction MUL Rx, Ry with encodings where Rx>Ry, an additional encoding could be allocated for a squaring instruction which performs MUL Rx, Rx to square the value in register Rx. Typically, the number of commutative operations for which it is interesting to perform the operation when Rx=Ry is less than the total number of commutative operations to be supported, and so even if a few of the operations have separate encodings defined for Rx>Ry and Rx=Ry respectively, overall the total number of instructions encodings required can be reduced.

The first class of instructions may also include at least one non-commutative instruction for which the corresponding processing operation is a non-commutative operation. A non-commutative operation may be an operation for which changing the order of the operands produces a different result when the operands are not all equal (e.g. a function f(m, n) for which f(A, B)≠f(B, A) when A≠B). For example, subtraction is a non-commutative operation because 4−1 does not equal 1−4. Other examples of non-commutative operations include divide and shift operations (e.g. shifting operand A by a number of bit positions specified by operand B does not in general give the same result as shifting operand B by a number of bit positions specified by operand A).

One might expect that an instruction encoding which constrains Rx>Ry would not be desirable for non-commutative instructions because it would still be of interest to allow Rx<Ry as this would produce a different result. However, even if the instruction set architecture only permits Rx>Ry for a given non-commutative operation, the input values could be written to the architectural registers in different orders by previous instructions so that the non-commutative operation can still be applied to the correct values in the correct order despite the restriction in the architectural register numbers Rx, Ry. For example, the destination registers of earlier instructions which generate the operands to which the non-commutative operation is to be applied could be selected so that the first operand for the non-commutative operation is in a register with a higher architectural register number than the register used for the second operand. Alternatively, a register move instruction could be executed before the non-commutative instruction to move a data value from one register to another to ensure that the operands are in appropriate registers complying with the restriction Rx>Ry and the non-commutative operation instruction can be executed with the operands in the correct order.

However, executing additional move instructions or constraining the registers which can store the operands for a non-commutative operation may affect performance. To avoid this, and simplify compiler design, the first class of instructions may include at least one pair of complementary non-commutative instructions which correspond the same type of non-commutative operation. For each pair, one instruction of the pair controls the processing circuitry to perform the non-commutative operation with the first and second operands in a different order to the other instruction to the pair. For example, a complementary pair of subtract instructions may be provided, e.g. with SUB Rx, Ry corresponding to Rx−Ry and SUBR Rx, Ry corresponding to Ry−Rx. By including both the non-reversed and reversed versions of the non-commutative operation as separate instructions, the compiler has complete freedom to place the operands of the non-commutative operations in any architectural registers.

One may expect that this detracts from the very purpose of constraining the architectural register number encodings Rx, Ry in the first place. However, there is still an advantage to encoding the architectural registers in this way because by shifting the redundancy to other parts of the instruction than the register specifying fields, this can coalesce the redundant portions of the encoding space into a contiguous portion which makes decoding those operations and/or reclaiming such redundant portions for other operations simpler.

The pair of complementary non-commutative instructions could be distinguished in different ways. In some cases, the pair of instructions could have different opcodes. In some cases, the opcodes of the complementary pair of non-commutative instructions could be identical except for one bit which is different—this approach can simplify decoding circuitry as the bit which differs can be used to active logic for reversing the order of the registers. Alternatively, the pair of instructions may have the same opcode but may have an additional bitfield which specifies the order in which the operands are to be processed using the non-commutative operation.

Alternatively, in addition to the first class of instructions where Rx>Ry, there could also be a further class of instructions where Rx is constrained to be less than Ry, with one instruction in each of the first and further classes being assigned to the same non-commutative operation (e.g. one bit of the opcode could select whether the decoded values of Rx and Ry are inverted, effectively reversing which of Rx and Ry is greater), but commutative operations may only have a single instruction assigned in either the first class or the further class.

The first class of instructions may include at least one register range specifying instruction for controlling the processing circuitry to perform a processing operation using a plurality of registers corresponding to architectural register numbers in a continuous range between the first architectural register number Rx and the second architectural register number Ry. For example, the register range specifying instruction could be a load or store multiple instruction for transferring data between the registers and corresponding addresses in memory, or a push or pop instruction for transferring data between the registers and a stack. For register range specifying instructions, there may be no significant benefit to being able to encode the range both in ascending order and in descending order, so by constraining the register encoding so that Rx>Ry, some instruction encodings can be made available for use for encoding other operations making the overall encoding of the ISA more efficient. Note that in systems supporting register renaming, although the architectural register numbers may be identified as a continuous range by the register range specifying instruction, the corresponding physical register numbers need not be in a continuous range, because each architectural register number could be mapped to discrete physical registers within the physical register file.

The first and second architectural register numbers Rx, Ry may not be identified explicitly in the instruction encoding of the first class of instructions. Therefore, the apparatus may comprise register decoding circuitry which decodes the instruction encoding of the first class of instructions to identify the first and second architectural register numbers Rx, Ry. In some cases the register decoding circuitry could be part of the instruction decoder which decodes the instruction itself, so that the instruction decoder decodes both the opcode of the instruction to identify what processing operation to perform and register identifying bits of the instruction to identify the actual architectural register numbers Rx, Ry.

In other cases, the register decoding circuitry could be provided separately from the instruction decoder. For example, the instruction decoder could initially decode the opcode, but then at a subsequent stage such as a register renaming stage or issue stage, the architectural register numbers Rx, Ry could be decoded. However, in general the earlier the first and second architectural register numbers Rx, Ry can be identified, the sooner hazards between instructions specifying the same architectural register can be identified, so it may be beneficial to provide the register decoding circuitry as early as possible, e.g. in the instruction decoding stage.

In some cases, the encoding of the architectural register numbers Rx, Ry could be combined with the encoding of at least one further parameter of the instruction, such as an immediate value, control flag or other parameter. In this case, a common bitfield (or several bitfields) of the instruction could be decoded to identify Rx, Ry and the further parameter, with only register pairs where Rx>Ry being allocated valid encodings of the bitfield(s). Combining the encoding of the register numbers Rx, Ry with encoding of a further parameter in this way may allow the instructions to be encoded more efficiently than if separate fields for the registers and further parameter are provided.

In other examples some bits of the instruction encoding of the first class of instructions may be allocated specifically for identifying the first and second architectural register numbers Rx, Ry, and any other parameters of the instruction may be identified separately in different fields of the instruction. In this case, for an ISA providing $2^N$ architectural registers, in the first class of instructions the first and second architectural registers Rx, Ry may be represented using 2N−1 bits of the instruction encoding. For example, if the architecture provides 16 or 32 registers then Rx and Ry can be represented using 7 or 9 bits respectively. In contrast, if the instruction encoding permitted free choice of the architectural register numbers Rx, Ry, then 2N bits would be required. Hence, by saving one bit in the register specifying fields, this either allows the instruction width to be reduced or frees up encoding space in other parts of the instruction for use in encoding other operations.

When there are $2^N$ architectural registers and Rx and Ry are represented using 2N−1 register identifying bits, the number of combinations of Rx and Ry where Rx>Ry is $2^N 2^{N-1}/2$, leaving $2^{N-1}$ spare values of the register identifying bits which can be used for other purposes. Some of these spare encodings can be used to represent a second class of instructions for which the instruction opcode or other parts of the instruction encoding can be interpreted differently to the first class of instructions, so that other opcodes are free for encoding other operations.

For example, the second class of instructions may comprise instructions which only require one input operand and so only need to specify one source architectural register number. For example, such single input instructions may include an instruction for reversing the order of the bits in a specified register, or for counting the number of leading zeroes in the data value stored in a given register. Also, there may be some commutative operations as discussed above for which it is interesting to apply the operation to two identical inputs (e.g. the squaring instruction mentioned above). Such instructions can be encoded using some of the spare bit patterns of the register identifying bits, to avoid needing to use up other opcodes for these single-input operations.

The number of spare bit patterns may not be enough to identify all the possible architectural registers as the single source register of a single-input operation, and so for the second class of instructions, a bit of the opcode field of the first class of instructions may, together with at least a subset of the register identifying bits, identify the single source register. Hence, the opcode of the second class of instruction may effectively be one bit shorter, so that there are fewer instructions in the second class of instructions than the first class of instructions.

For the first class of instructions, there may be a wide variety of encoding schemes which could be used to encode Rx and Ry in a given pattern of bits. Most generally, each possible bit pattern of the register identifying bits may be arbitrarily mapped to a given pair of registers Rx, Ry for which Rx>Ry, leaving some bit patterns spare which can be used for the second class of instructions as discussed above. However, some encoding schemes may require more complex decoding circuitry than others.

A particularly efficient encoding is to provide a first register field A dependent on Rx when a most significant bit of Ry is 0, and dependent on a result of inverting all bits of Rx when a most significant bit of Ry is 1; and a second register field B having a value dependent on remaining bits of Ry other than the most significant bit of Ry. This can be decoded by selectively flipping the contents of the A field depending on a comparison of A and B, so that Rx and Ry can be decoded with relatively little circuitry.

In one example, the second register field B may have a value dependent on the results of a bitwise exclusive OR (XOR) of the remaining bits of Ry with corresponding bits of Rx. This encoding has several advantages. Firstly, the spare bit patterns reused for the second class of instructions are coalesced into encodings in which all bits of the second register field B are zero and the most significant bit of the first register field A is also zero, making decoding of the second class of instructions simpler. Also, the decode logic is relatively simple and fast compared to logic for decoding other encodings.

In another example, the second register field B may have a value dependent on the remaining bits of Ry when the most significant bit of Ry is 0, and dependent on a result of inverting the remaining bits of Ry when a most significant bit of Ry is 1. With this approach, the spare encodings may have the least significant bits of A equal to corresponding bits of B.

Another technique for exploiting the redundancy in the architectural register number encodings is to allow free choice of which architectural registers are specified as Rx and Ry, but to derive some additional information from a comparison of Rx and Ry. For example, the processing circuitry may select whether to perform a first type of processing operation or a second type of processing operation using registers corresponding to Rx, Ry based on the comparison of Rx and Ry. In general, the first and second types of processing operation may be any processing operations which generate a different result for at least some combinations of input values. Hence, rather than constraining the register encodings as discussed above, the register encoding can be chosen from any of the available architectural register numbers, but by comparing the architectural register numbers at least one piece of additional information can be derived which can then affect how the instruction is decoded so that even if remaining parts of the instruction encoding are otherwise identical, different types of processing operations can be performed by the processing circuitry. Again, this can either eliminate the need to provide another bit of the encoding to identify that piece of additional information, allowing shorter instructions, or this may free up an additional bit of the encoding for other purposes to allow increased functionality to be supported using a given number of instruction bits.

For some instructions, when Rx>Ry, the processing circuitry may perform the first type of processing operation, and when Rx<Ry, the processing circuitry may perform the second type of processing operation. Hence, the order in which the operands are encoded may effectively provide an additional bit of the opcode for selecting the type of processing operation.

This approach may be particularly useful when the first and second types of processing operation are different commutative operations. As discussed above, for commutative operations the result will be the same when the commutative operation is applied to a given pair of registers regardless of which of those registers is specified as the first operand or the second operand. Hence, the order in which the registers are specified for a given instruction opcode may be used to signal some other information. In some cases the commutative operations could be entirely different. For example the first type of processing operation could be an add and the second type of processing operation could be XOR. In other cases, the first and second types of processing operation may correspond to essentially the same kind of arithmetic or logical operation, but with the second type of processing operation being a modified version of the first type (e.g. the second type of operation may return the absolute magnitude of the result of the first type of operation).

When there is free choice of Rx and Ry and Rx>Ry and Ry<Rx correspond to the first and second processing operations respectively, there would also be some encodings where Rx equals Ry. These could be handled in several different ways:

For some instructions, when Rx=Ry the processing circuitry may select either the first type of processing operation or the second type of processing operation. For example, the first type of processing operation could be selected when Rx≥Ry and the second type of operation could be selected when Rx<Ry. There are some types of processing operation for which encoding both types of operation may not make sense when Rx=Ry. For example, if the first type operation is a subtraction, and the second type of operation produces the absolute magnitude of the result of the subtraction, when Rx=Ry both operations would produce a result of 0, so there would be no value in providing separate encodings for the two types of operation when Rx=Ry—instead when Rx=Ry this may lead to the first type of operation being selected.

Alternatively, for some instructions when Rx=Ry a third type of processing operation may be performed. Hence, the encoding where Rx=Ry could signal an entirely different operation to the operations when Rx>Ry or Rx<Ry.

Another approach may be that for certain instructions, the encoding where Rx=Ry is simply an invalid encoding which does not correspond to any type of processing operation. When such an encoding is encountered then the instruction decoder may signal an undefined instruction, or may treat the instruction as a NOP.

Not all instructions of the ISA need use the same approach for handling cases when Rx=Ry. A given ISA may have some instructions using one of these approaches and other instructions using another.

For other instructions, the first type of processing operation could be performed when Rx and Ry are different, and the second type of processing operation could be performed when Rx equals Ry. This is particularly useful when the first type of processing operation is a non-commutative operation. For non-commutative operations, both the possible orders in which a given register pair could be encoded may be of interest since a non-commutative operation would give a different result when the order of the operands are reversed. However, for some non-commutative operations when both operands are the same, the result may be uninteresting or could be generated using an alternative operation. For example, for the BIC operation (Rx AND (NOT Ry)), when Rx=Ry the result is always 0, so instead the encoding of the BIC operation where Rx=Ry could signal a different second type of processing operation, e.g. the bit reverse operation for reversing all bits of the data value in register Rx. Other examples of non-commutative operations for which the result when Rx=Ry may be uninteresting are integer subtraction (Rx−Rx is always 0), division (Rx/Rx is always 1) or ORN (A ORN B is equivalent to A OR (NOT B), and so Rx ORN Rx is always an all-ones bit pattern, i.e. 0xffff . . . , or −1).

The apparatus may have register number comparison circuitry to compare the first and second architectural register numbers Rx Ry, and decoding circuitry for identifying the type of processing operation to be performed based on an opcode of the instruction and a result of the comparison performed by the register number comparison circuitry. For example, the opcode could be supplemented by an additional opcode bit derived from the register comparison, which can be decoded along with the opcode to identify the required processing operation to be performed using the registers. This avoids the need to represent that additional opcode bit in the explicit instruction encoding.

An example of an instruction for which it may be useful to perform different operations when Rx>Ry and Rx<Ry respectively is a compare instruction, for which the first type of processing operation may comprise a determination of whether the first and second operands are equal and the second type of processing operation may comprise a determination of whether the first and second operands are unequal. Since the equal and unequal comparisons are commutative, there is no need to be able to represent both Rx>Ry and Rx<Ry, and so these can be represented using a common encoding with the relative ordering of the register numbers signalling whether the equal condition or the unequal condition is to be used. The encoding where Rx=Ry can no longer distinguish the equal and unequal conditions, but comparisons of whether a given value is equal or unequal to itself can typically be evaluated with other operations.

More particularly, the compare instruction may have a comparison condition field. When the comparison condition field has a first value, the processing circuitry may determine whether the first and second operands are equal when Rx>Ry, and determine whether the first and second operands are unequal when Rx<Ry. When the comparison condition field has a second value, the processing circuitry may determine one of: (i) whether the first operand is greater than the second operand, and (ii) whether the first operand is less than or equal to the second operand, irrespective of whether Rx>Ry or Rx<Ry. When the comparison condition field has a third value, the processing circuitry is configured to determine one of: (i) whether the first operand is greater than or equal to the second operand, and (ii) whether the first operand is less than the second operand, irrespective of whether Rx>Ry or Rx<Ry. With this approach, a two-bit field is enough to represent six different comparison conditions (less than (<), greater than (>), less than or equal (≤), greater than or equal (≥), equal (==) and not equal (!=)), rather than a three-bit field as one might expect. This is possible because although not all the comparison conditions have dedicated encodings of the comparison condition field, equivalent results can be applied using one of the other comparison conditions with the operands specified in the opposite order (e.g. Rx>Ry is equivalent to Ry≤Rx). An encoding of the comparison condition field is also left spare for use in signalling another operation if desired.

For all the examples discussed above, the technique can also be used in a virtual machine execution environment. A virtual machine may be provided as a computer program stored in a computer-readable storage medium, which may be a non-transitory storage medium. When executed by a computer which does not itself have instruction decoding or processing circuitry for processing instructions encoded as discussed above, the virtual machine program interprets the instructions according to that encoding and controls the processing circuitry to perform corresponding operations. For example the virtual machine program may map the instructions to native instructions supported by the processing circuitry of the host computer. This allows code written for another platform supporting the encoding techniques discussed above to be executed on the computer which does not itself support these techniques.

FIG. 1 schematically illustrates an example of a data processing apparatus 2 comprising a processing pipeline 4 for performing data processing in response to instructions. The pipeline 4 includes a number of pipeline stages including a fetch stage 6 for fetching instructions to be processed from an instruction cache 8, a decode stage 10 for decoding the fetched instructions, a register rename stage 12 for performing register renaming to map architectural registers specifiers specified by the decoded instructions to physical register specifiers identifying physical registers 14 provided in hardware, an issue stage 16 for queuing instructions awaiting execution while their operands become available and issuing instructions for execution when the operands are available, and an execute stage 18 for executing the issued instructions. The issue stage 16 could be an in-order pipeline in which instructions are executed in the same order as a program order in which the instructions were fetched from the instruction cache 8 by the fetch stage 6, or an out-of-order pipeline which may permit out-of-order issue of instructions for execution in a different order to the program order.

The execute stage 18 may include a number of execute units for processing different kinds of instructions, such as an arithmetic/logic unit (ALU) for executing arithmetic or logical instructions, a floating point (FP) unit for executing floating point instructions and a load/store unit for executing load instructions for loading data from a memory system or store instructions for storing data to the memory system. As shown in FIG. 1, the memory system may include the instruction cache 8, a level 1 (L1) data cache 26, a level 2 (L2) cache 28 and main memory 30. In this example the L2 cache 28 is used as a shared Instruction/data cache, but separate L2 instruction and data caches could also be provided. Also, it will be appreciated that there could be more than two levels of cache.

FIG. 1 is merely schematic and for conciseness it does not show all possible components of the processing apparatus 2, so the apparatus 2 could also include other elements. The arrangement of particular pipeline stages in the pipeline 4 shown in FIG. 1 is just one example, and other types of pipeline stage could be provided. While FIG. 1 shows an example in which the execute stage 18 reads data values from the registers 14 and writes data values back to the registers 14, in other examples data could be read from the source registers of instructions while instructions are pending in the issue stage 16. Also, it is possible to provide a separate write back stage subsequent to the execute stage for writing results of instructions back to the registers 14. Also, some pipelines 4 may have a separate dispatch stage between the rename stage 12 and the issue stage 16 for providing a buffer so that instructions can leave the rename stage 12 even if the issue stage 16 is full. While FIG. 1 shows an example of a pipeline including a register renaming stage 12, this is optional and other pipelines may omit the rename stage 12. For example, in-order pipelines which process the instructions in their original program order may not need a rename stage 12. If the rename stage 12 is not provided then the architectural registers specified by the decoded instructions also identify the physical registers 14 to be accessed in response to those instructions.

The decode stage 10 decodes the instructions according to a certain instruction set architecture (ISA). Each instruction has a certain number of bits and the ISA defines how those bits are to be interpreted. In general there may be a wide variety of different processing operations to be supported by the processing pipeline 4. For ease of understanding, the examples below focus on a limited subset of operations, for example add, subtract (SUB), AND, OR, multiply (MUL), divide (DIV), bit reverse (BITREV, an operation to reverse all the bits of a given value, e.g. reversing the bits of 0001 yields 1000) and count leading zeros (CLZ, e.g. the leading zero count of a value 0011 is 2). It will be appreciated that in practice most ISAs will define other types of operations such as shifts, push or pop operations for pushing or popping data from a stack or similar data structure, load or store instructions, branch instructions etc. The examples below are simplified for the sake of brevity. Also, the examples below assume that the architecture defines 16 architectural registers accessible in response to the instructions. It will be appreciated that other architectures could define other numbers of registers, e.g. 32. Note that this does not limit the number of physical registers 14 provided in hardware. When register renaming is supported then the physical register file may have a greater number of physical registers than there are architectural registers defined in the architecture.

As shown in the example of FIG. 2, the subset of operations discussed above could be represented using 15 bits, with 4 bits representing a destination architectural register Rd to which the result of the instruction is to be written, 3 bits representing an instruction opcode OPC identifying the type of operation to be performed, 4 bits representing a first source architectural register Rx, and 4 bits representing a second source architectural register Ry. The ADD, SUB, AND, OR, MUL and DIV instructions are all two-source instructions which require both the source registers Rx and Ry and control the processing pipeline 4 to perform the corresponding processing operation on operand stored in the registers Rx, Ry, with the result being written to architectural register Rd. The BITREV and CLZ instructions only require one source register Rx and in this case the bitfield corresponding to Ry is ignored. It will be appreciated that the 15 instruction bits shown in FIG. 2 may only represent a portion of the overall encoding space. For example the instructions may have greater than 15 bits, in which case some of the other bits of the instruction may specify whether the 15 bits shown in FIG. 2 should be interpreted as shown in the encoding of FIG. 2 or interpreted in some other way for other instructions such as shifts or load/store instructions.

As there are 16 architectural registers and the source and destination registers Rx, Ry, Rd are each represented by four bits, there is a free choice of which architectural register is used as each of the source registers and the destination register. However, this scheme includes some redundancies since for example the ADD instruction when applied to a given pair of architectural registers (e.g. R1 and R2) will give the same result regardless of which of R1 and R2 is specified as the first source operand Rx and which is specified as the second source operand Ry. Similarly, the AND, OR and MUL instructions are commutative instructions for which reversing the order of the source operands Rx and Ry does not change the result.

In contrast, FIG. 3 shows an alternative encoding for representing the subset of operations discussed above, in which, for a first class of instructions shown in the left hand part of FIG. 3, the first and second source architectural registers Rx, Ry are represented using an encoding which constrains Rx to be greater than Ry. The destination architectural register Rd and opcode OPC are still represented using 4-bit and 3-bit fields respectively.

In the first class of instructions of FIG. 3, the two source architectural registers Rx, Ry are represented using two fields A, B which together comprise 7 bits rather than the 8 bits of FIG. 2. Two examples for encoding the fields A and B based on Rx and Ry are discussed below with respect to FIGS. 4A and 4B, but in general by re-encoding Rx, Ry with the encoding scheme where Rx>Ry as described below, we save one bit and sacrifice some functionality. A register cannot be added to or multiplied by itself, and we cannot encode all the unique cases for DIV or SUB in a single opcode. ADD's lost functionality can still be performed by a shift (left shifting an operand by one bit position is equivalent to adding the operand to itself).

The Rx/Ry coding scheme has, in this example, eight unused codepoints for the A, B fields. These are used to signal a separate opcode space for single-input operations, shown as a second class of instructions in the right hand part of FIG. 3. One additional bit is needed to fully specify the single outstanding source register, and this bit S is taken from the opcode encoding, leaving a two-bit opcode space for single-input operations, and a separate three-bit opcode space for two-input operations. BITREV and CLZ are placed into this one-input opcode space, along with the variant of MUL which squares its single input. This opens two slots in the two-input opcode space, which are used by reversed variants of SUB and DIV so that both Rx>Ry and Rx<Ry operand cases for these operations can be encoded.

In more realistic implementations the list of opcodes is likely to be longer, and will offer more flexibility in how things are moved about. It may include shifts; in which case these will require reversed versions as well, which suggests the possibility of a constant-shifted-by-register form of instruction. If a shift instruction supporting shifting of a register operand by a number of bits specified by an immediate constant is supported, the reversed form of the instruction could shift an immediate constant by a number of bit positions specified by a register operand, which could be useful for mask generation for example.

FIG. 3 shows an example where there are 16 architectural registers, but more generally if there are $2^N$ registers then constraining Rx>Ry means that there are $2^N 2^{N-1}/2$ valid combinations of Rx and Ry, which can be encoded in 2N−1 bits leaving $2^{N-1}$ unused values. With the coding scheme proposed here, these unused values can be used to signal a separate one-input operand space, but alternatively other types of operations could be represented using the second class of instructions using the spare encodings of the A and B fields. If the number of additional reverse-operand opcodes is few enough, then the opcode field need not be made larger, and the overall coding scheme becomes one bit smaller than the naive scheme. However, generally it might turn out that after adding the reversed opcodes for non-commutative operations, the opcode field grows by one bit and nothing is saved, but in this case the benefit is the consolidation of unused opcode space, simplifying decoding and keeping future expansion from becoming complicated.

FIGS. 4A and 4B show two example encodings for the A and B fields of the instruction encoding shown in FIG. 3. In FIG. 4A, two N-bit architectural register specifiers Rx, Ry, with X always greater than Y, are encoded as follows:
For a two-input operation requiring two source registers Rx, Ry:
A=x EOR Replicate(y<N−1>);
B=x<N−2:0> EOR y<N−2:0>;
instruction=binary_opcode:B:A:d;
To encode a single source register Rx for a one-input operation:
A=x EOR Replicate(x<N−1>);
B=0;
S=x<N−1>; instruction=unary_opcode:S:B:A:d;
In this notation:
  v<b> means bit b of value v, e.g. y<N−1> refers to bit N−1 from value y.
  v<b:a> means a range of bits a to b of value v, (where b is conventionally greater than a), e.g. x<N−2:0> means bits 0 to N−2 of value x.
  EOR means exclusive OR (XOR)
  Replicate( ) means a full-width value formed by repeating the bits of the argument within the brackets( ). Hence, Replicate(y<N−1>) comprises N bits all equal to bit N−1 of y (which is the most significant bit of y). Effectively, A=x if the most significant bit of y is 1, and A=invert(x) if the most significant bit of y is 0.
  The colons (:) indicate concatenation, with the most significant bits first. So if binary_opcode was 101, B was 00, A was 10 and d was 1001, the result of binary_opcode:B:A:d would be the value 10100101001.

FIG. 4A shows the possible values of A and B for each pairing of Rx and Ry when using this encoding. Note that the combinations of Rx and Ry shown with dark shaded entries in the table are invalid because these have Ry>Rx and the entries shown with crosses are invalid because these have Rx=Ry. From the symmetry of the table we can see that by restricting Rx to greater than Ry, we reduce the number of possible combinations to just less than half of the total number, and this is why one bit can be saved. Also, there are some spare encodings as shown at the bottom of FIG. 4a which can be reused for the one-input operations. In this example the spare encodings have B=000 and A=0??? (where ? is either 0 or 1—these bits together with the additional opcode bit S identify the single source register Rx for one of the single-input operations such as BITREV, CRZ or the squaring MUL instruction).

Note that encoding a given pair of architectural register specifiers to produce the A and B values would not be performed by the apparatus 2 of FIG. 1 itself, but would be performed by a compiler or an assembler when generating the instructions to be executed based on source code or compiled code.

Decoding circuitry for decoding the A and B fields to identify the architectural register specifiers Rx, Ry is provided at some point at the pipeline 2. Although the register decoding could place at any stage (e.g. at register renaming), the earlier the architectural register numbers are identified, the earlier hazard detection can be performed. Hence, it may be desirable for the register decoding to take place at the decode stage 10.

Figure 5:
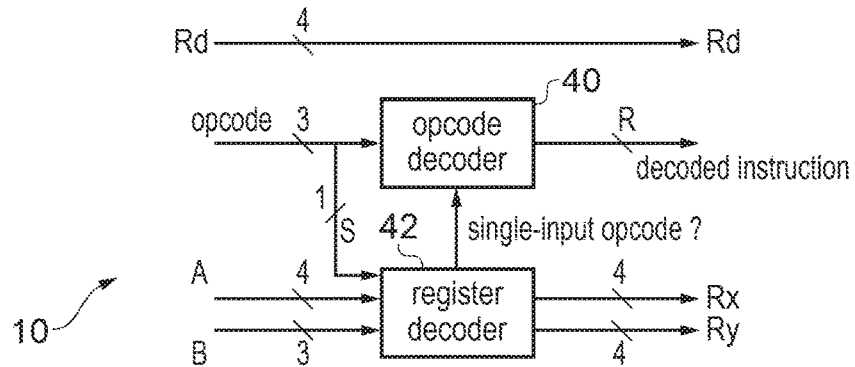
FIG. 5 shows an example of a decode stage for decoding instructions encoded as shown in FIG. 3.

FIG. 5 shows an example of a portion of the decode stage 10 for decoding the instructions. As shown in FIG. 5, the decode stage may include an opcode decoder 40 and a register decoder 42. The destination register specifier Rd is passed through the decode stage 10 unchanged as it is identified explicitly in the instruction encoding. The register decoder 42 receives the A and B fields of the instruction together with the additional opcode bit S and decodes these to identify the first and second source architectural registers Rx and Ry. The register decoder 42 also identifies from the A and B fields whether the current instruction is one of the single-input instructions (second class of instructions), and provides an indication to the opcode decoder 40 of whether this is the case. The opcode decoder 40 decodes the opcode of the instruction according to whether the instruction is one of the first class or second class of instructions, and outputs a given number of bits identifying the decoded instruction. The decoded instruction may comprise any number of bits required for controlling the subsequent stages of the pipeline to process the instruction appropriately, e.g. signals for selecting which of several functional units within the execute stage 80 should process the instruction.

When the encoding shown in FIG. 4A is used, the register decoder 42 may decode the A and B fields and the additional opcode bit S using the following operations:

```
boolean binary = (B:A<N-1> != Replicate('0'));
bits(N-1) tmp_y = B EOR A<N-2:0>;
boolean flip = ('0':tmp_y:S > A:'0');
bits(N) mask = flip ? Replicate('1', N) : Replicate('0', N);
bits(N) x = A EOR mask;
bits(N) y = '0':tmp_y EOR mask;
```

The "binary" flag can be used to signal to the opcode decoder 40 whether the opcode should be interpreted as a binary opcode (first class operation) or a unary opcode (second class operation).

Figure 6A:
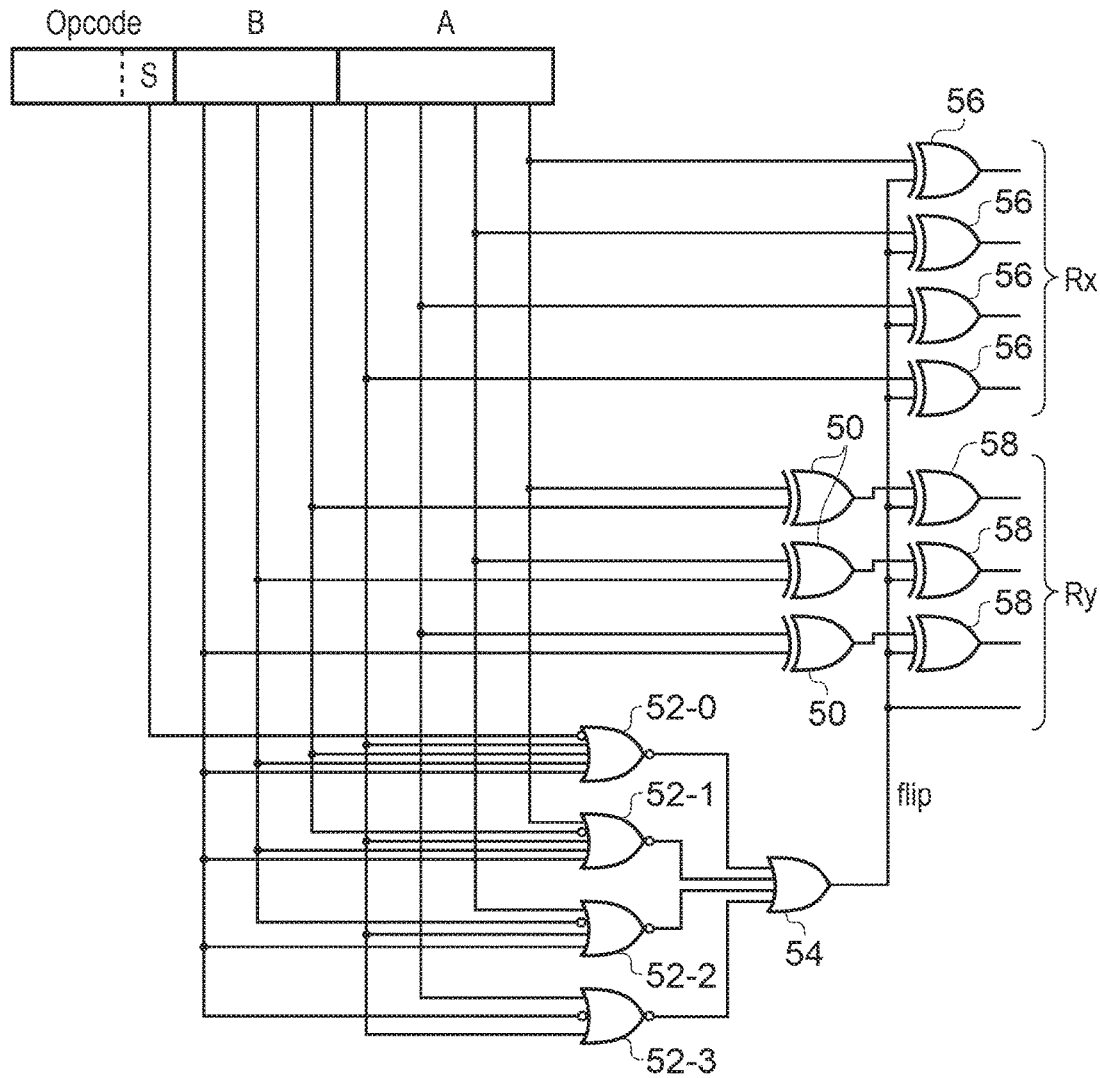
FIG. 6A shows a first example of circuitry for decoding the first and second register fields according to the encoding scheme of FIG. 4A.

This may seem like a relatively complex series of operations, but the logic for determining this in circuitry is in fact simpler than implied by the expressions above. For determining the value "flip" which affects whether the values of A and tmp_y are inverted, a first non-zero scan of B can be used to select which bit from A determines whether or not A is larger than A XOR B. FIG. 6A shows an example of circuitry for decoding A and B to identify Rx, Ry. The circuitry includes a series of exclusive OR gates 50 which XOR respective bits of B with corresponding bits of A (i.e. these gates 50 effectively determine the value of "tmp_y" in the expressions above). The circuitry also includes a series of NOR gates 52 whose outputs are combined by an OR gate 54. The output of the OR gate 54 represents the parameter "flip" shown above. NOR gate 52-0 receives as inputs an inverted version of the additional opcode bit S, the three bits of the B field and the top bit of the A field and its output will be 1 only if S=1, B=000 and the top bit of A is 0. NOR gate 52-1 receives as inputs the top two bits of B, the top bit of A, an inverted version of the lowest bit of B and the lowest bit of A, and its output will be 1 if B=001 and A=0??0 (again all bits represented with a ? can be either 0 or 1). NOR gate 52-2 receives as inputs the top bit of B, the top bit of A, an inverted version of the second bit of B and the second lowest bit of A, and its output will be 1 if B=01? and A=0?0?. Finally, NOR gate 52-3 receives as inputs the top two bits of A and an inverted version of the top bit of B, and its output will be 1 if B=1?? and A=00??. If any of the NOR gates 52 outputs 1 then "flip"=1 as generated by the OR gate 54. When "flip" equals 1, the A field is inverted using XOR gates 56 to produce the first source register specifier Rx. Also, when "flip" equals 1 then the most significant bit of Ry is 1 and the other three bits of Ry are formed by XOR bits 58 inverting the outputs of corresponding bits of tmp_y as generated by XOR gates 50. Alternatively, when "flip" equals 0, Rx=A, the top bit of Ry=0 and the remaining bits of Ry equal corresponding bits of B.

Figure 6B:
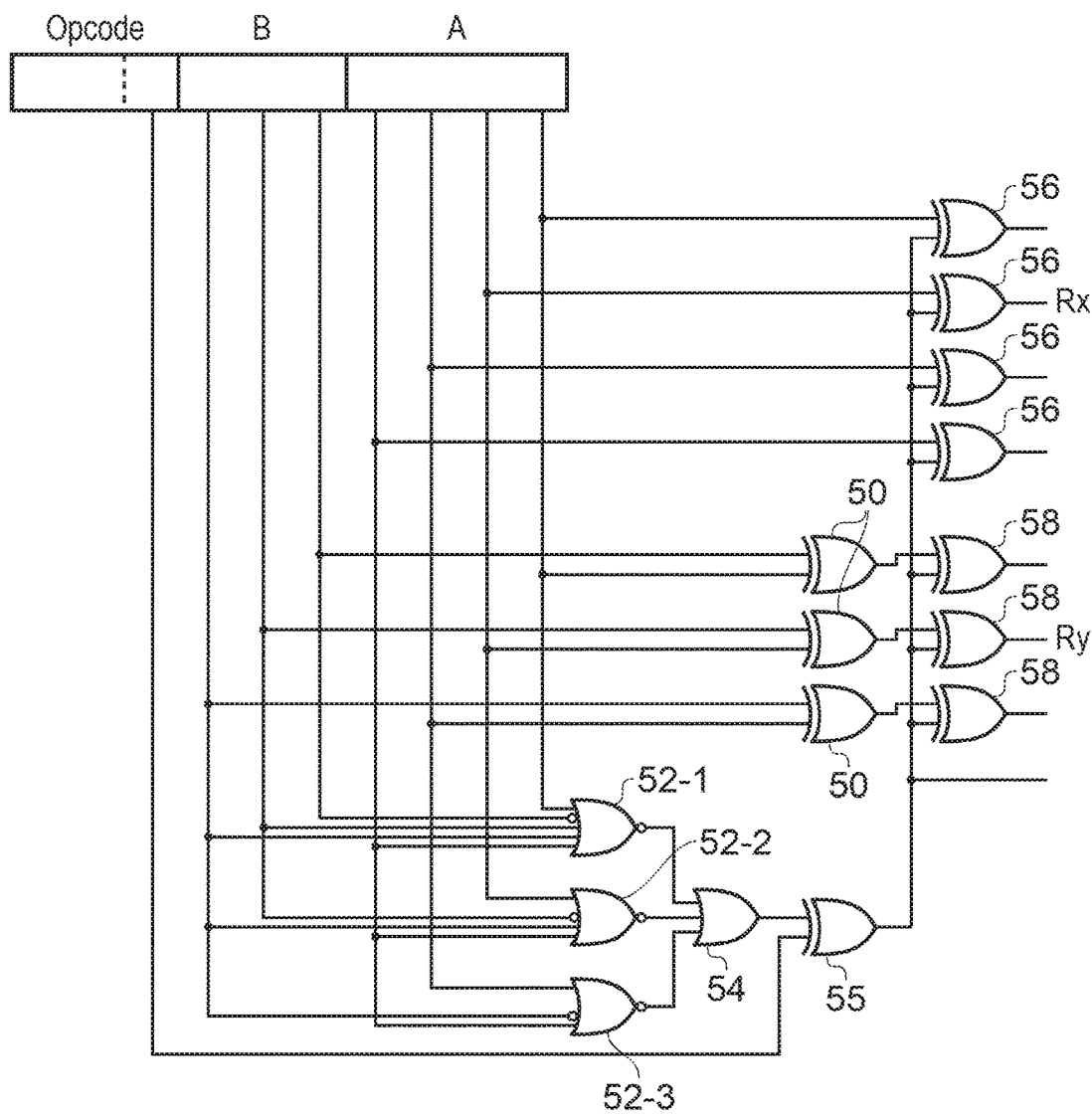
FIG. 6B shows a second example of decoding circuitry.

FIG. 6B shows a second example of encoding logic. In this example, an additional XOR gate 55 is provided on the path between OR gate 54 and XOR gates 56, 58. XOR gate 55 receives as its second input a selected bit of the opcode (e.g. the lowest bit). With such decode logic, the opcodes have the property that every second opcode, by opcode number, inverts the Rx>Ry condition to effectively be Rx<Ry (since the XOR gate 55 effectively inverts all the bits of the final Rx, Ry result); this makes it possible to assign a single non-commutative operation to two different opcode slots so that all operand orders are made possible. When encoding given values of Rx, Ry for one of the reversed non-commutative instructions for which the inversion is applied by gate 55, a corresponding inversion to Rx, Ry should be performed before applying the encoding process shown above, to ensure that the correct values of Rx and Ry are returned. Hence, the pair of complementary instructions corresponding to the same non-commutative operation but with different operand orders are effectively represented with opcodes which differ only by one bit, allowing relatively simple decoding using only one additional gate 55. On the other hand, for commutative operations only one opcode slot is assigned, with the pair of adjacent opcodes that differ only by one bit corresponding to entirely different commutative operations. Note that while in FIG. 6B the NOR gate 52-0 of FIG. 6A is omitted for conciseness (e.g. this could be an example which does not reuse the spare encoding space in A, B for one-input operations), but in other examples the NOR gate 52-0 could also be provided.

FIG. 4B shows a second example encoding of the A and B fields which could be used. Again, Rx is constrained to be greater than Ry. In this case, for given values Rx, Ry in the range from 0 to $2^N-1$ and the constraint that Rx>Ry, A and B are encoded as follows:

```
if (y >= 2^(N-1)) then
    A = x EOR (2^N-1) //(2^N-1 is a value having N-1 bits all = 1)
    B = y EOR (2^N-1)
else
    A = x
    B = y
endif
```

We can observe that because of this constrained value of Ry, B will always turn out to be less than $2^{N-1}$ and so we can have one bit removed.

FIG. 4B is a table showing the different encodings available with this encoding scheme. Again there are some spare encodings but this time these are values for which the top bit of A is zero and the remaining bits of A are equal to corresponding bits of B. Hence, while the spare encodings differ to that of FIG. 4A, this still permits a separate second class of instructions using a different interpretation of the opcode to be defined which are distinguished from the first class by particular values of the register fields A, B. For these spare encodings, the single source register Rx shown in FIG. 3 is identified using the three bits of B (which are identical to the lower three bits of A) and the additional opcode bit S, and the operation to be performed using that single register Rx is identified by the remaining two bits of the opcode field.

To decode A and B for the first class of instructions when encoded in the way shown in FIG. 4B the following logic can be used:

```
if (B >= A) then
    x = A EOR (2^N-1)
    y = B EOR (2^N-1)
else
    x = A
    y = B
endif
```

This approach may require a slightly deeper decode logic because the digital comparison of B and A to determine whether B>=A may require a number of XNOR gates. For the second class of instructions, the comparator can determine whether the lower 3 bits of A equal corresponding bits of B, and if so Rx can be determined from S and B directly without any decoding.

Other more arbitrary mappings of particular combinations of Rx and Ry for which Rx>Ry onto the potential values of the A and B fields could be selected. In general it does not matter which particular pair of registers is represented by each different encoding of the A and B fields, but the examples shown in FIGS. 4A and 4B are particularly advantageous in reducing the amount of decode logic required and FIG. 4A is particularly efficient because it requires relatively shallow logic as shown in FIG. 6 and it consolidates the spare encodings into a common portion of the encoding space for which B is 000 and the top bit of A is also 0.

Figure 7:
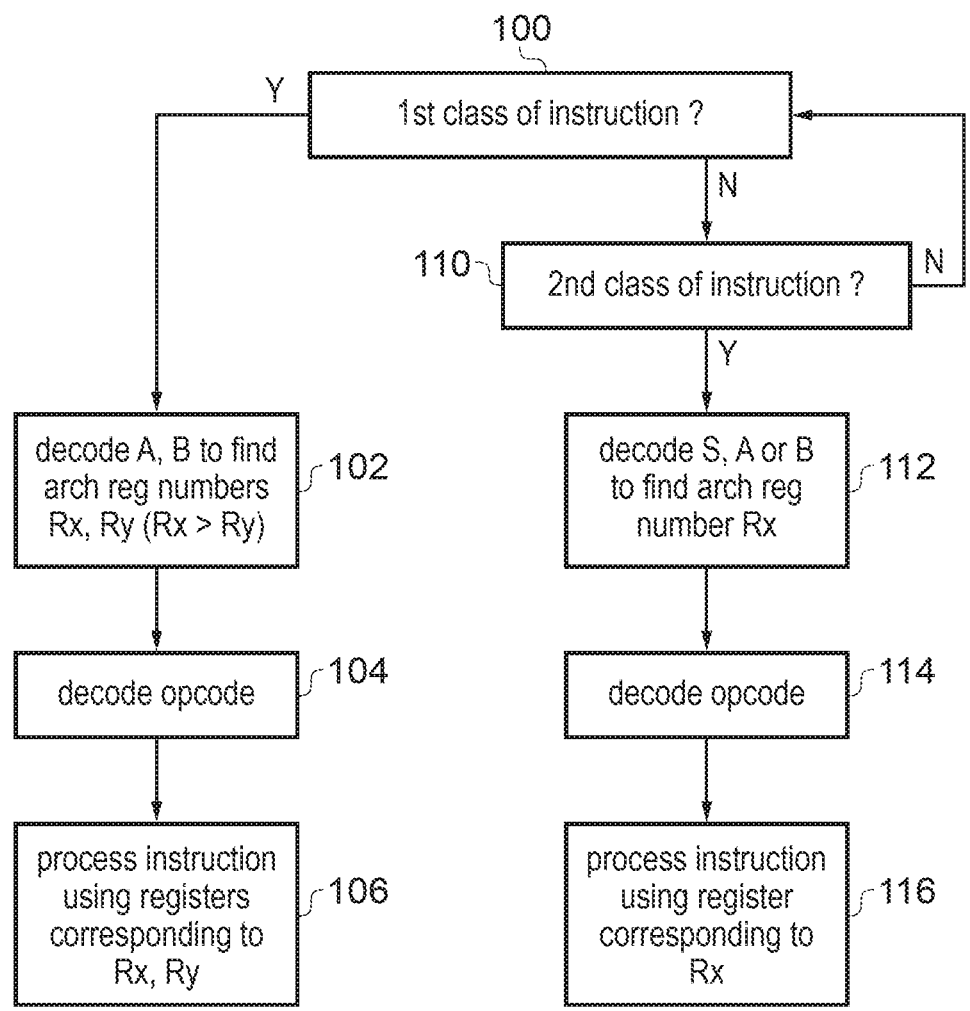
FIG. 7 shows a method of processing instructions.

FIG. 7 shows a method of processing instructions. At step 100 the decoder determines whether the current instruction is one of a first class of instructions (e.g. if A, B does not have one of the spare encodings). If the instruction is of the first class, at step 102 the register fields A and B are decoded to determine the architectural register numbers Rx, Ry to be used for the instruction, where Rx>Ry. At step 104 the decode stage 10 decodes the opcode of the instruction. At step 106 subsequent stages of the pipeline process the instruction using the registers corresponding to the identified architectural registers Rx and Ry. Note that these may be physical registers with different physical register numbers as remapped by the rename stage 12. While Rx>Ry, there is no constraint in which physical registers are used.

On the other hand, if the instruction is not one of the first class of instructions then at step 110 it is determined whether the instruction is of a second class of instructions. If not then the instruction is processed in some other way. To determine whether an instruction is of the second class, this can be identified from whether the A and B fields have one of the spare encodings as discussed above. If the instruction is of the second class, then at step 112 the additional opcode bit S and the subset of bits of the A and B fields (e.g. the lower three bits of the A field) are decoded to determine the architectural register number Rx of a single source register. At step 114 the opcode of instruction is decoded according to the unary opcode decoding scheme. At step 116 subsequent pipeline stages process the instruction to perform the type of operation represented by the opcode using the single register corresponding to architectural register number Rx.

In the examples above, the registers Rx, Ry represented are the source registers which contain the source operands for corresponding processing operation. However, it is also possible to use this encoding scheme for encoding a destination register or other types of registers. For example, some instructions identify a list of architectural registers starting from a start register and finishing with an end register, and control the processing circuitry to perform a given operation using a continuous block of architectural registers having architectural numbers between the start and end registers. For example, a load multiple instruction may load data values from a number of addresses into registers corresponding to a continuous block of architectural register numbers, or a store multiple instruction may store data from the specified registers to corresponding addresses in memory. Also, some stack instructions (push or pop instructions) may save data to a stack from the range of registers or restore data to the registers from the stack. In this case, the start and end architectural registers defining the list of registers could also be encoded using a similar scheme to the one shown above. The definition of a first class of instructions and a second class of instructions where the second class of instructions is represented using some of the spare encodings of the register fields in the first class is also useful for such list based instructions, because where the first class gives a multi-register list, and the second class gives only a single register, it can be useful that more opcodes are available to the first class of operations than the second class so as to describe different potential interactions between elements of the list.

Figure 8:
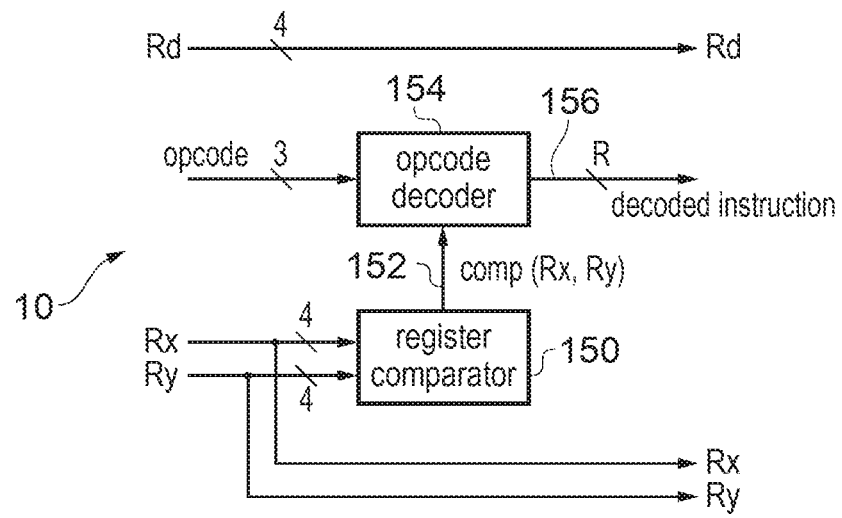
FIG. 8 shows a second example of instruction decoding circuitry including a register comparator for comparing first and second architectural register numbers.

FIG. 8 shows an alternative example of exploiting the redundancy in the register encodings Rx, Ry. In this example, the instructions could be encoded with Rx and Ry identified explicitly in the instruction and any combination of Rx and Ry permitted. For example, this may use the encoding shown in FIG. 2. However, as shown in FIG. 8, the decode stage 10 may include a register comparator 150 for comparing Rx and Ry and generating a comparison result signal 152 which is provided to the opcode decoder 154 to indicate which of Rx and Ry is greater. The opcode decoder 154 may decode the opcode of the instruction in different ways depending on the comparison result indicated by signal 152, so that different decoded instructions 156 are generated from the same opcode depending on which of Rx and Ry is greater. Essentially, the relative ordering of Rx and Ry provides at least one bit of additional information which can supplement the opcode so that either the opcode field itself can be made one bit smaller or a greater number of different operations can be supported using a given number of bits of the opcode. Note that in some cases the additional information from the comparison signal 152 could be regarded as a separate flag rather than an extension of the opcode.

This can be used in different ways. In some cases, the operations represented by the Rx>Ry and Rx<Ry forms of the instruction could essentially correspond to the same type of operation, but with the operation being modified in some way based on the comparison result. An example of this would be deriving an "absolute" modifier for an arithmetic (e.g. multiply) instruction, which affects the result. In this case, Rx<Ry might mean "don't take the positive absolute value of the result" and the Rx>Ry case would mean "take the absolute value". The Rx==Ry case just falls into the "don't" case, since any number multiplied by itself is positive anyway and has no need of the absolute flag. We can then just define the 'absolute' flag as being clear if Rx<=Ry and set if Rx>Ry. Hence, by using the relative ordering of Rx and Ry, there is no need to encode the absolute flag in the instruction.

Alternatively, the operation performed when Rx>Ry and Rx<Ry could be completely different. In general, if one bit is taken from the operation fields, this can be supplemented with the ordering of the Rx and Ry registers so that there are essentially three different techniques for interpreting the opcode field, opcode set 0 for Rx>Ry, opcode set 1 for Rx<Ry, and opcode set 2 for Rx=Ry (set 2 being the single-input opcode to the type discussed above). While this approach may require deeper test logic (since the comparison provided by the comparator 150 may require more circuitry than that of FIG. 6 shown for the encoding which constrains Rx to be greater than Ry), it has the advantage that no decode is needed before the register operands are visible and so this may help activate operand forwarding logic of a pipeline sooner and may allow hazards between different instructions to be detected sooner. Which particular operations are combined into a single opcode encoding can be selected arbitrarily by the instruction set designer.

For example, the AND, OR, and MOV operations could be combined into a single opcode point. If Rx is less than Ry, then we treat the opcode as an AND operation and return Rx AND Ry. If Rx is greater than Ry then we treat the opcode as an OR operation and return Rx OR Ry. If Rx and Ry are equal it really doesn't matter which we do, because in either case the result is equivalent to a MOV operation, so we call that case MOV. We can then take all of our commutative operations where at least half of them have no need to handle the Rx=Ry case, and we pair them up into shared opcode numbers. For example, we can't pair ADD and SUB, because SUB needs to accept arguments in either order, but we could pair ADD and EOR, because Rx+Rx gives Rx*2, and Rx EOR Rx gives zero, and there will be other ways of getting a zero result without the use of EOR (e.g. Rx–Rx) so we don't need it to handle that case (Rx*2 may also be redundant as it is equivalent to a left shift by 1 place).

Figure 9:
FIG. 9 shows an example encoding of a compare instruction.

FIG. 9 shows another example of an instruction which may use the approach shown in FIG. 8. FIG. 9 shows a compare instruction where a condition field (cond) identifies what comparison condition is to be applied to two source operands in architectural registers Rx and Ry. This is not commutative, but we can reorder operands and change the operation to get equivalent operation.

If we have a hypothetical CMP instruction, there are six basic ways you can compare the two inputs Rx and Ry: less than (<), greater than (>), less than or equal (<=), greater than or equal (>=), equal (==) and not equal (!=). These six operations would require three bits to encode, plus the bits for the two register indices Rx and Ry, for a total bit count of (Nx+Ny+3), where Nx and Ny are the number of bits used to specify Rx and Ry respectively. By using commutativity and equivalence, we can encode these more efficiently.

Assume we have a free choice of Rx and Ry, encoded with (Nx+Ny) bits. We actually only need three choices for operations, not six:

CMP (Rx<Ry) is equivalent to CMP (Rx>=Ry), so we only need to encode just one of these two instructions.

CMP (Rx<=Ry) is equivalent to CMP (Rx>Ry), so again we can encode just one choice.

CMP (Rx==Ry) and CMP (Rx!=Ry) are commutative so we can encode them both with one operation value, and choose the correct operation based on whether Rx<Ry or Rx>Ry.

However in this last case, if Rx==Ry, then we can't distinguish the equals operation from not equals. But because these are trivial cases, we can again transform them into other operations which give the same answers. So:

CMP (Rx==Rx) is always true, as is CMP (Rx<=Rx) so we encode that instead.

CMP (Rx!=Rx) is always false, as is CMP (Rx<Rx) so we encode that instead.

These combinations allow us to use just 2 bits to encode the comparison operation, for a total of (Nx+Ny+2) bits.

Note that for such a comparison instruction, there would be two separate comparisons performed—one to compare the register specifiers Rx, Ry to identify what type of comparison condition is being used, and another comparison performed later in the pipeline to compare the actual data values stored in the registers according to the selected comparison condition.

Figure 10:
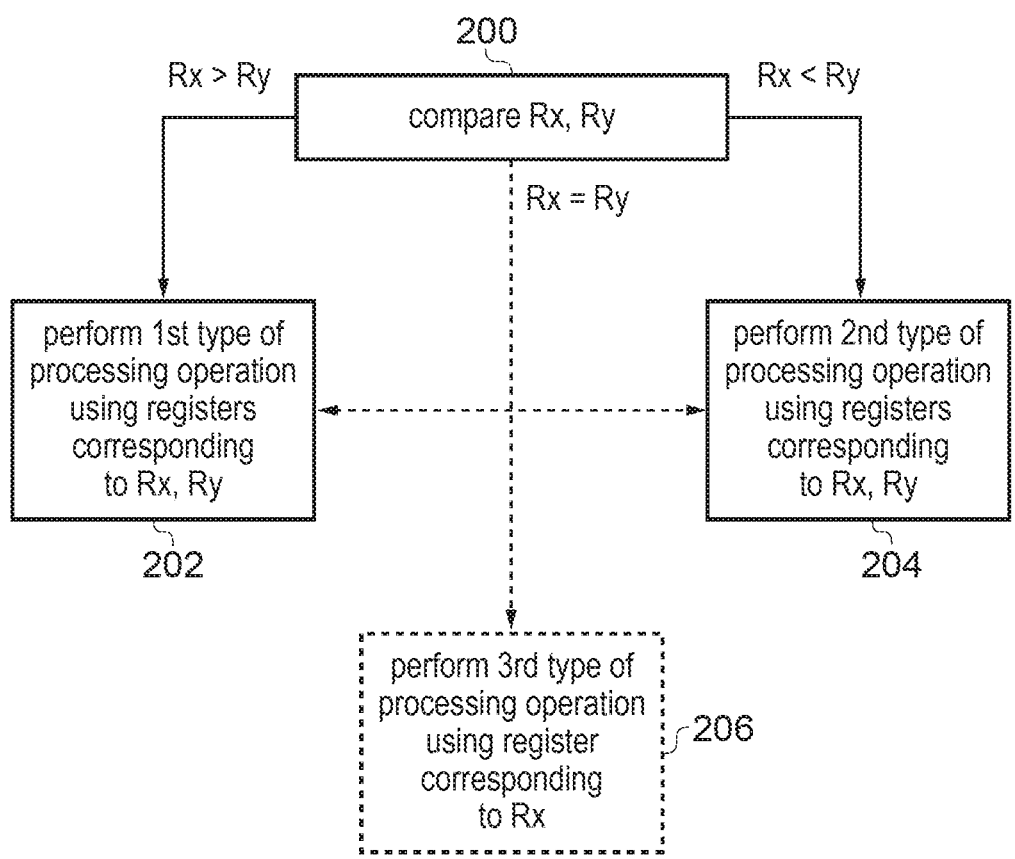
FIG. 10 shows a method of processing instructions.

FIG. 10 shows a method of processing instructions encoded using the second example. At step 200 the instruction is received and the register fields Rx and Ry are compared by the register comparator 150. If Rx is greater than Ry then at step 202 the opcode decoder 154 generates a decoded instruction 156 to control subsequent pipeline stages to perform a first type of processing operation using the registers corresponding to architectural register Rx and Ry. On the other hand, if Rx is less than Ry then at step 204, the opcode decoder 154 decodes the opcode to generate a decoded instruction 156 which controls the rest of the pipeline to perform a second type of processing operation using registers corresponding to Rx and Ry. This second type of processing operation could be the same as the first type of processing operation but modified in some way (such as taking an absolute magnitude of the result), or could be an entirely different operation. When Rx=Ry, then either the decoder could proceed to one of steps 202 or 204 so as to control the processing pipeline to perform either the first or second type of processing operation, or at step 206 a decoded instruction corresponding to a third type of processing operation performed using a single register corresponding to Rx could be generated. Another alternative would be for some instructions for the Rx=Ry encoding to be invalid so that in this case no decoded instruction is generated under an undefined instruction exception could be signalled. The approach taken for Rx=Ry could vary from opcode to opcode.

Alternatively, for some instructions a first type of operation may be selected when Rx>Ry or Rx<Ry, and a second type of operation may be selected when Rx=Ry. E.g. a subtract instruction generates different results depending on whether Rx>Ry or Rx<Ry, but the result when Rx=Ry is always 0 and could be generated by other operations, so the encoding for the SUB opcode where Rx=Ry may be reused for another operation, e.g. a single-input operand. A similar approach may be taken for other non-commutative operations for which the result when Rx=Ry is uninteresting, e.g. BIC, DIV, ORN etc.

Figure 11:
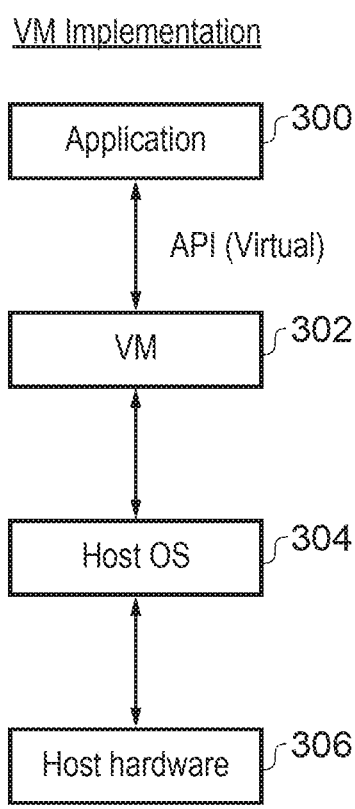
FIG. 11 shows a virtual machine implementation that may be used.

FIG. 11 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 330 typically running a host operating system 320 supporting a virtual machine program 310. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 310 is capable of executing an application program (or operating system) 300 to give the same results as would be given by execution of the program by a real hardware device. Thus, the program instructions, including the control of memory accesses described above, may be executed from within the application program 300 using the virtual machine program 310.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
a plurality of registers to store data values; and
processing circuitry to perform processing operations in response to instructions;
wherein in response to one of a first class of instructions identifying first and second architectural register numbers, the processing circuitry is configured to perform a corresponding processing operation using first and second registers corresponding to the first and second architectural register numbers; and
instructions of said first class of instructions have an instruction encoding which constrains said first architectural register number to be greater than said second architectural register number; and
wherein the processing circuitry is configured to process instructions according to an instruction set architecture providing $2^N$ architectural registers, and in said first class of instructions, the first and second architectural register numbers are represented using only 2N−1 bits of the instruction encoding.

2. The apparatus according to claim 1, wherein said first class of instructions includes at least one commutative instruction for which the corresponding processing operation is a commutative operation.

3. The apparatus according to claim 1, wherein said first class of instructions includes at least one non-commutative instruction for which the corresponding processing operation is a non-commutative operation.

4. The apparatus according to claim 1, wherein said first class of instructions includes at least one pair of complementary non-commutative instructions corresponding to the same type of non-commutative operation applied to first and second operands stored in the first and second registers, where for each pair, one instruction of the pair is for controlling the processing circuitry to perform the non-commutative operation with the first and second operands in a different order to the other instruction of the pair.

5. The apparatus according to claim 1, wherein said first class of instructions includes at least one register range specifying instruction for controlling the processing circuitry to perform a processing operation using a plurality of registers corresponding to architectural register numbers in a continuous range between the first architectural register number and the second architectural register number.

6. The apparatus according to claim 1, comprising register decoding circuitry to decode the instruction encoding of the first class of instructions to identify the first and second architectural register numbers.

7. The apparatus according to claim 1, wherein the instruction encoding of said first class of instructions includes an opcode field and a plurality of register identifying bits representing the first and second architectural register numbers according to a predetermined encoding scheme for which a plurality of spare bit patterns of said plurality of register identifying bits do not correspond to any valid combination of the first and second architectural register numbers for which the first architectural register number is greater than the second architectural register number;
the instruction set architecture comprises a second class of instructions having an instruction encoding comprising said opcode field and said plurality of register identifying bits, for which said plurality of register identifying bits have one of said spare bit patterns; and
in response to one of said second class of instructions, the processing circuitry is configured to interpret the opcode field of the instruction differently to an identical opcode field of one of said first class of instructions.

8. The apparatus according to claim 7, wherein the second class of instructions comprises at least one instruction identifying a single source architectural register number for controlling the processing circuitry to perform a corresponding processing operation using a register identified by said single source architectural register number.

9. The apparatus according to claim 8, wherein the single source architectural register number is represented in the instruction encoding of the at least one instruction of the second class using a subset of the register identifying bits and a bit of the opcode field.

10. The apparatus according to claim 1, wherein the instruction encoding of the first class of instructions comprises:
a first register field dependent on the first architectural register number when a most significant bit of the second architectural register number is 0, and dependent on a result of inverting all bits of the first architectural register number when a most significant bit of the second architectural register number is 1; and
a second register field having a value dependent on remaining bits of the second architectural register number other than the most significant bit of the second architectural register number.

11. The apparatus according to claim 10, wherein the second register field has a value dependent on a result of a bitwise exclusive OR of said remaining bits of the second architectural register number with corresponding bits of the first architectural register number.

12. The apparatus according to claim 10, wherein the second register field has a value dependent on the remaining bits of the second architectural register number when the most significant bit of the second architectural register number is 0, and dependent on a result of inverting the remaining bits of the second architectural register number when a most significant bit of the second architectural register number is 1.

13. A computer-readable storage medium storing a computer program for controlling a computer to provide a virtual machine execution environment corresponding to the apparatus according to claim 1.

14. A data processing method, comprising:
controlling processing circuitry to perform processing operations in response to instructions;
wherein in response to one of a first class of instructions identifying first and second architectural register numbers, the processing circuitry is controlled to perform a corresponding processing operation using first and second registers corresponding to the first and second architectural register numbers; and
instructions of said first class of instructions have an instruction encoding which constrains said first architectural register number to be greater than said second architectural register number;
wherein the processing circuitry is configured to process instructions according to an instruction set architecture providing $2^N$ architectural registers, and in said first class of instructions, the first and second architectural register numbers are represented using only 2N−1 bits of the instruction encoding.

* * * * *